United States Patent [19]

Knoll

[11] Patent Number: 4,483,080

[45] Date of Patent: Nov. 20, 1984

[54] ALIGNMENT DETECTION SYSTEM

[75] Inventor: Frederick A. Knoll, Central Islip, N.Y.

[73] Assignee: TEK Precision Co., Ltd., Deer Park, N.Y.

[21] Appl. No.: 361,835

[22] Filed: Mar. 25, 1982

[51] Int. Cl.³ .......................................... G01C 15/00
[52] U.S. Cl. ..................................... 33/286; 33/318; 33/321; 33/352
[58] Field of Search ................ 33/318, 321, 322, 333, 33/351, 180 R, 286, 230, 228, 301, 316, 317, 338

[56] References Cited

U.S. PATENT DOCUMENTS

| | | | |
|---|---|---|---|
| 2,516,435 | 1/1950 | Trimbach et al. | 33/286 |
| 2,570,275 | 10/1951 | Reading | 33/1 |
| 2,814,125 | 11/1957 | Hartwig | 33/286 |
| 3,071,959 | 1/1963 | Depp | 73/1 |
| 3,253,472 | 5/1966 | Klemes | 74/5.4 |
| 3,612,949 | 10/1971 | Becraft | 33/286 |
| 3,731,543 | 5/1973 | Gates | 33/318 |
| 3,734,627 | 5/1973 | Edwards | 33/286 |
| 3,816,935 | 6/1974 | Wilmot | 33/228 |
| 3,851,399 | 12/1974 | Edwards | 33/228 |
| 3,899,834 | 8/1975 | Harrison, Jr. | 33/352 |
| 3,975,831 | 8/1976 | Jysky et al. | 33/333 |

Primary Examiner—Willis Little
Attorney, Agent, or Firm—Hedman, Gibson, Costigan & Hoare

[57] ABSTRACT

Apparatuses and processes for detecting misalignments between various portions of a deformable body, such as an aircraft, are disclosed. Orientation detection devices, such as potentiometric vertical indicators and gyros, are provided at a master module disposed at a predetermined location on the structure and in a remote module located at a predetermined portion of the structure remote from the reference location. The orientation of the remote portion of the structure, as determined from the remote module is compared to the orientation of the master module to thereby determine the orientation of the remote portion of the structure relative to a fixed reference. The orientation detection devices are secured to the various locations through the use of a standardized track and base assembly, whereby virtually all components of the master and remote modules are interchangeable. The remote module may be disposed on a trammel point assembly wherein the orientation of a predetermined surface may be determined. Finally, an alignment check component is provided which utilizes a laser or optical scope for detecting remote orientations without having to place a remote module at the remote location.

18 Claims, 15 Drawing Figures

AIRCRAFT ALIGNMENT FIXTURE MODULE COMPONENTS

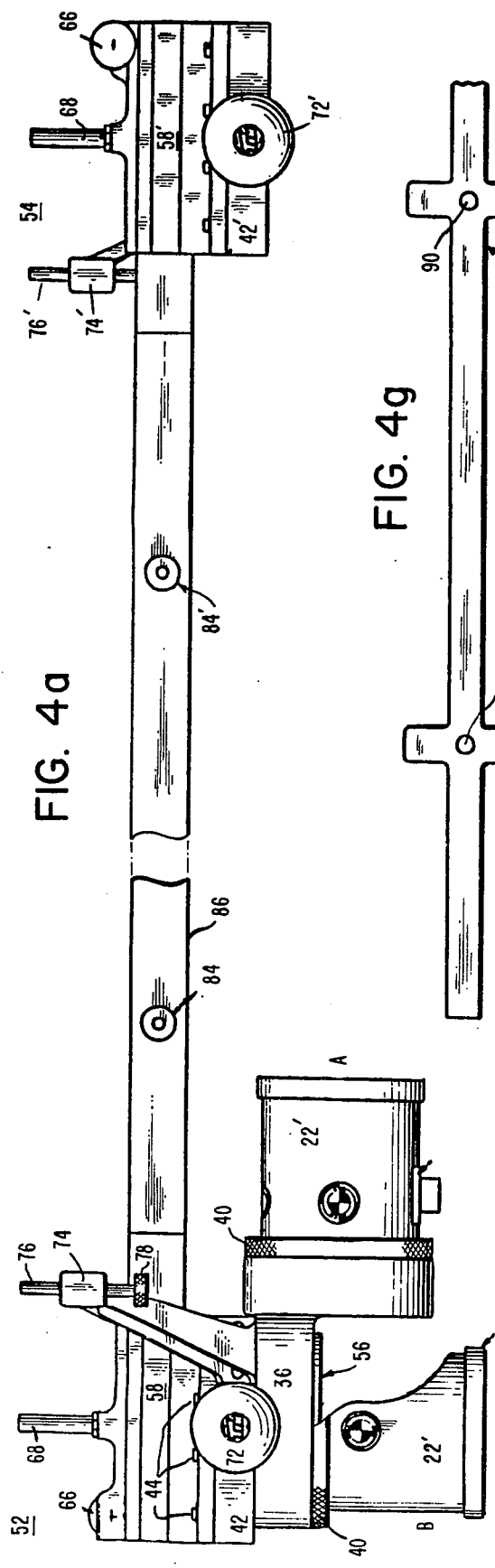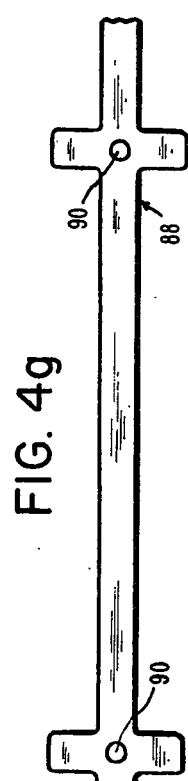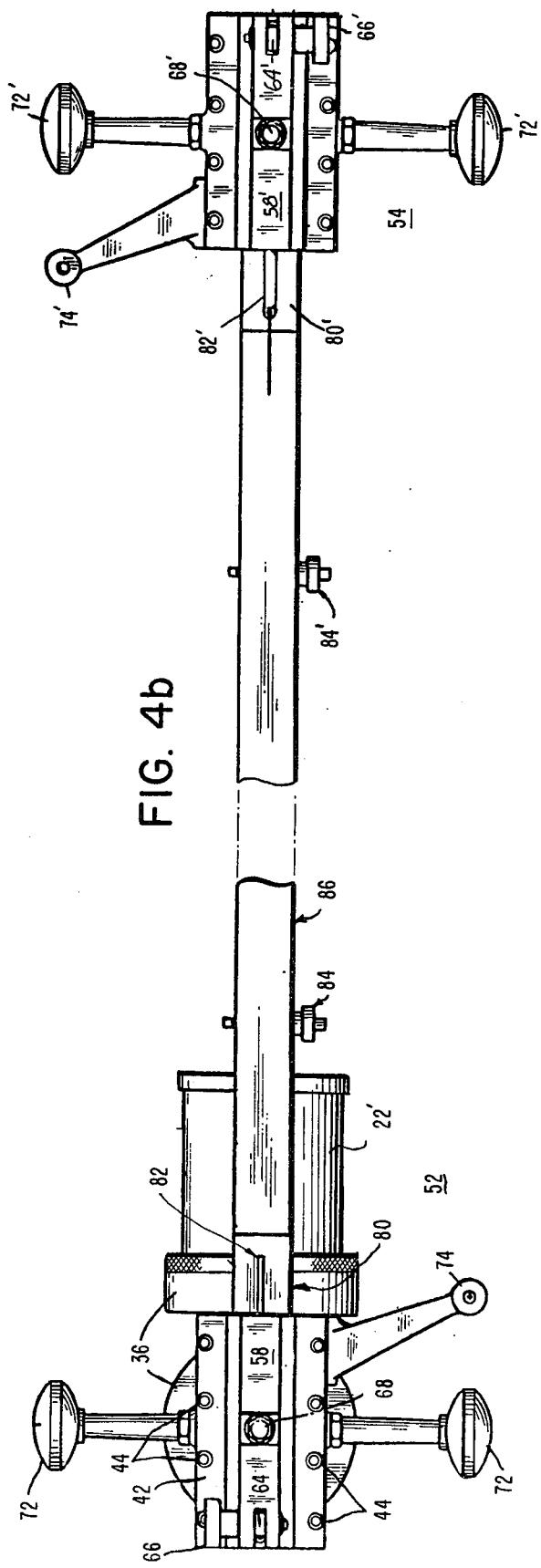

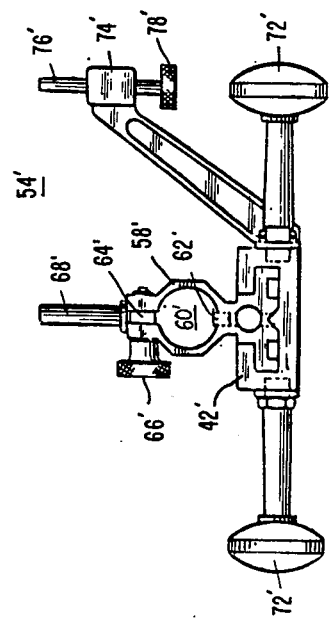
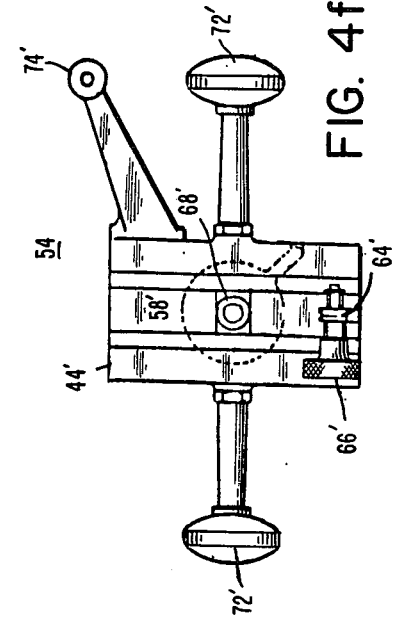
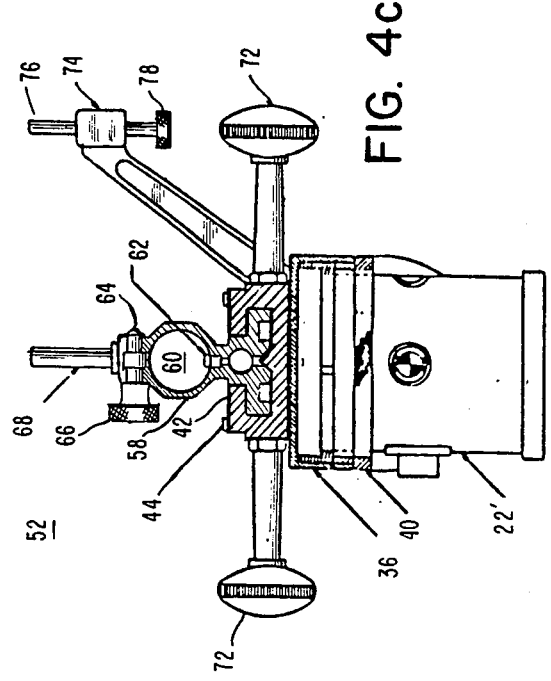
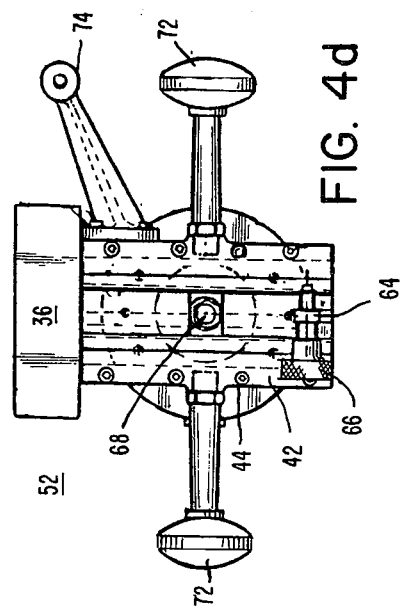

ALIGNMENT DETECTION SYSTEM

DESCRIPTION OF THE INVENTION

The present invention is directed to apparatus and a process for detecting misalignments between the various portions of a deformable body, such as an aircraft.

There exist systems in which a deformable structure, specifically an aircraft, may be checked for misalignments and other structural deficiencies. For example, in an aircraft having an inertial navigation system, it is of paramount importance that the inertial navigation system be mounted in substantially perfect alignment with the aircraft fusilage, wings, etc. Also, each of the various aircraft structures, such as the wings, vertical stabalizers, etc. must be properly aligned for safe aircraft operation.

Two such systems which perform such alignment checks are disclosed in U.S. Pat. No. 3,816,935 to Wilmont and U.S. Pat. No. 3,731,543 to Gates. Wilmont employs a single gyro which is mounted on a reference, or "base line" fixture to establish a zero reading. The gyro is subsequently moved to remote locations where the pitch, roll and yaw of the remote locations relative to the base line location may be determined. Particular mounting platforms are disclosed for the various fixtures and include an inertial navigation system platform, weather radar system platform, and a flux valve guide rail.

Gates discloses a system for determining misalignments of various portions of the aircraft while the aircraft is on a moving base such as an aircraft carrier. Like Wilmont, Gates compares main and remote gyro axes to determine misalignment. However, inertial sensors are employed to turn off the detection circuitry when the aircraft carrier motion rates are unfavorable.

The above systems each employ three axis gyro units which are expensive and tend to drift over time. Additionally, the prior art does not provide a reliable technique of checking and comparing the pitch angle formed by a predetermined area of the wings of the aircraft. Finally, the above systems each require that the particular point of the aircraft to be measured must be physically provided with one of the gyro units, thus leading to expensive and time consuming use of mounting brackets, and the like.

It is therefore an object of the invention to provide a structural alignment technique for detecting the alignment of a deformable structure which does not require the use of three axis gyro units.

It is a further object to provide a structure alignment detection system for detecting the absolute and relative pitch of a predetermined area of aircraft wings in a reliable, precise and accurate manner.

It is a further object to provide a structure alignment detection system for detecting misalignments of one portion of a deformable structure relative to another portion without having to physically dispose a position sensor at one of the two relative locations.

It is a further object to provide a structure alignment detection system which can detect the relative disposition of two remote points on a deformable structure without requiring the leveling or prealignment of the structure prior to the detection.

It is a further object to provide a structure alignment detection system which comprises a plurality of interchangeable modules to thereby cut down on hardware requirements and operation time and expense.

In accordance with the first aspect of the invention, an apparatus for detecting the orientation of a remote portion of a structure relative to a reference portion comprises a reference track adapted to be secured to the reference portion, reference orientation detection apparatus adapted to be slidably secured to the reference track, a remote track adapted to be positioned at the remote portion, remote orientation detection apparatus adapted to be slidably secured to the remote track, and an indicator for receiving signals from the reference and remote orientation detection apparatuses. The reference track and the remote track are of substantially identical configuration, whereby the reference and remote orientation detection apparatuses are interchangeable on the reference and remote tracks.

Specifically, the reference orientation detection apparatus is adapted to be secured to the reference track by a reference bracket. Similarly, the remote orientation detection apparatus is adapted to be secured to the remote track by a remote bracket. The reference and remote brackets are substantially identical and each comprise first and second fixtures adapted to selectively receive portions of the reference and remote orientation detection apparatuses. The first and second fixtures on the reference bracket are orthogonally disposed, and the first and second fixtures on the remote bracket are also orthogonally disposed.

More specifically, the reference orientation detection apparatus comprises a first unit for detecting the vertical orientation of the reference portion and a second unit for detecting the azimuthal orientation of the reference portion. The first unit is adapted to be mounted on the reference bracket at the first fixture and the second unit is adapted to be mounted on the reference bracket at the second fixture. Similarly, the remote orientation detection apparatus may include a first unit for detecting the vertical orientation of the remote portion and a second unit for detecting the azimuthal orientation of the remote portion. The first unit is adapted to be mounted on the remote bracket at the first fixture and the second unit is adapted to be mounted on the remote bracket at the second fixture. Alternatively, the remote orientation detection apparatus may comprise a single unit for detecting the vertical orientation of the remote portion, the single unit adapted to be mounted on the remote bracket at one of the first and second fixtures depending upon the orientation of the remote bracket at the remote portion.

The remote track may be secured to a trammel point assembly device having first and second ends adapted to be placed at first and second predetermined locations on a surface of the structure to thereby allow the remote orientation detection apparatus to detect the orientation of the surface from the first to the second predetermined locations.

According to a further aspect of the invention, first and second brackets are provided each having first and second fixtures relatively disposed at right angles. The first bracket is adapted to be positioned at the reference portion and the second bracket is adapted to be positioned at the remote portion. The reference orientation detection apparatus is adapted to be disposed on the first bracket and the remote orientation detection apparatus is adapted to be disposed on the second bracket. The reference and remote orientation detection apparatuses each include at least one of (i) a first unit for detecting vertical orientation and (ii) a second unit for detecting azimuthal orientation. At least one of the first and second units is removably secured to at least one of the first and second fixtures on the first bracket, and at least one of the first and second units is removably secured to at least one of the first and second fixtures on the second bracket.

In accordance with a further aspect of the invention, a bracket for use with apparatus for detecting the orientation of a remote portion of a structure relative to a reference portion includes first and second fixtures relatively disposed at right angles, the first fixture is adapted to secure a vertical orientation detection device while the second fixture is adapted to secure an azimuthal orientation detection device.

In accordance with a further aspect of the invention, a trammel point assembly includes first and second ends each provided with a probe, orientation detection apparatus adapted to be secured to the trammel point assembly to detect the orientation of the assembly, whereby when the assembly is placed on a surface such that the probes of the first and second ends are disposed at respective first and second predetermined location on the surface, the orientation detection apparatus detects the orientation of the surface from the first to the second predetermined locations.

Ideally, the first and second ends are separated by a shaft, and at least one of the first and second ends is provided with means for adjusting the length of the shaft.

In accordance with still a further aspect of the invention, a method for detecting the orientation of a surface of a structure relative to a reference portion includes the steps of placing a first end of a device having orientation detection apparatus secured thereto on a first predetermined location on the surface, the orientation detection apparatus provided to detect the orientation of the device. The second end of the device, remote from the first end, is placed on a second predetermined location on the surface. Orientation detection apparatus is also disposed at the reference portion, and the outputs of the orientation detection apparatus on the device and the orientation detection means at the reference portion are compared.

In accordance with a further aspect of the invention, apparatus for detecting the orientation of a selected portion of a deformable structure relative to a preselected location includes a target detector adapted to be mounted at the preselected location. A first device adjusts the azimuthal orientation of the target detector and a second device adjusts the vertical orientation of the target detector. A third device detects the azimuthal orientation of the target detector and a fourth device detects the vertical orientation of the target detector. Thus, when the target detector is aligned with the selected portion, the third and fourth devices act to indicate the orientation of the selected portion relative to the preselected location.

Specifically, the target detector may comprise a laser or alternatively an optical scope. The third and fourth devices may comprise synchro devices, while the first and second devices may comprise worm gears.

According to a final aspect of the invention a method for detecting the orientation of a selected portion of a deformable structure to a preselected location includes the steps of mounting a target detector at the predetermined location and adjusting the azimuthal orientation and the vertical orientation of the target detector until alignment of the target detector with the selected portion is detected. The azimuthal orientation and the vertical orientation of the target detector is detected upon the alignment to thereby detect the orientation of the selected portion relative to the preselected location.

These and other objects and aspects of the invention will be described in more detail with reference to the following drawing figures of which:

FIGS. 4A–4F illustrate in detail the trammel point assembly;

FIG. 4G illustrates an incidence check pattern which is placed on predetermined locations on the aircraft to aid in the placement of the trammel point assembly thereon;

Figure 1:
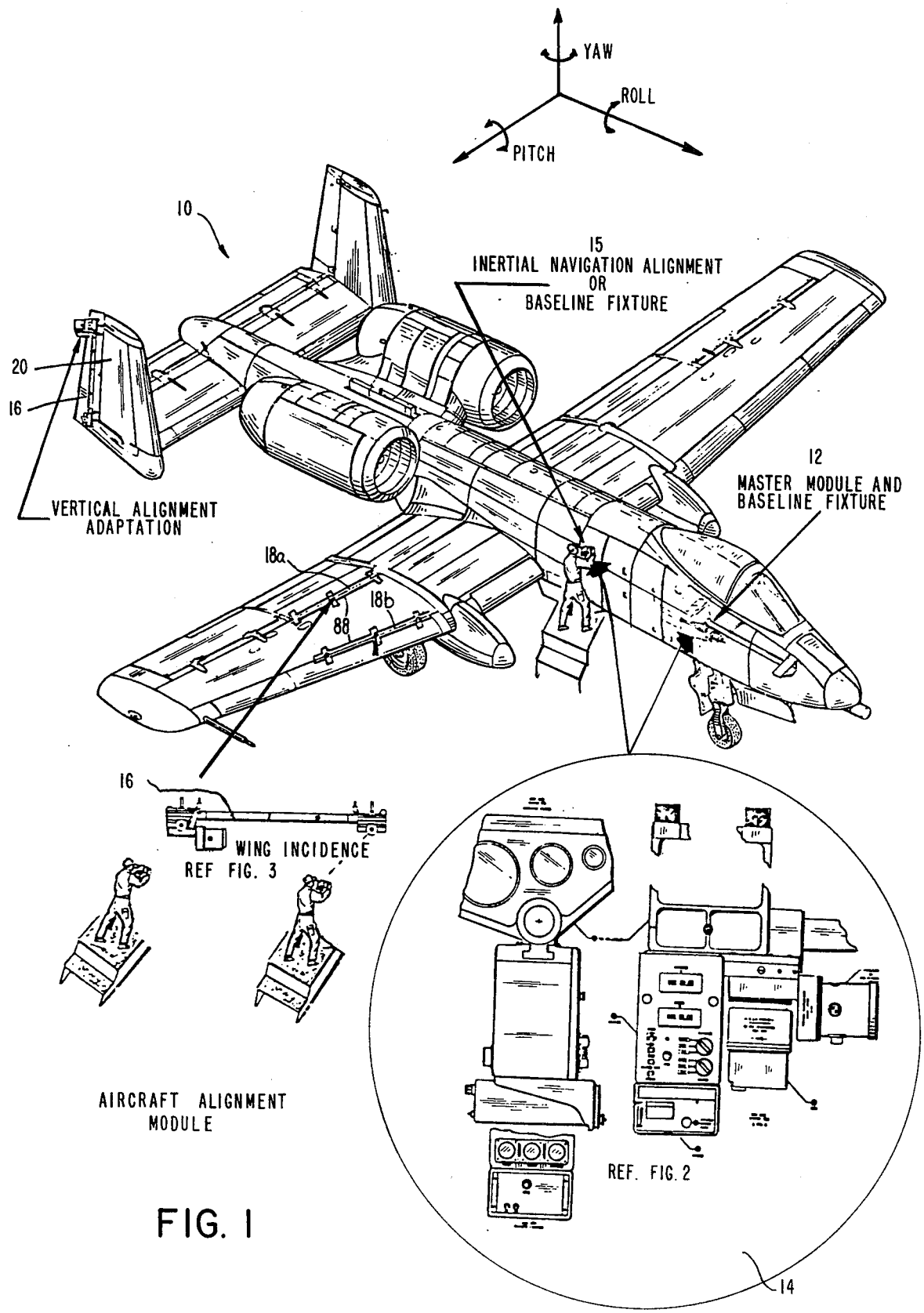
FIG. 1 is an overall system diagram illustrating the relative dispositions of the master and remote modules as variously disposed on an aircraft.

The structure alignment system in accordance with the present invention is illustrated in FIG. 1 as being employed to determine the structural integrity of aircraft 10. Mounted at baseline fixture 12 is master module 14 which will be described in more detail with reference to FIG. 2. The baseline fixture 12 as illustrated in FIG. 1 is shown as being at the gun mount, but can alternatively be provided at another fixed reference, such as the inertial navigation system (INS) fixture, if such is provided by the aircraft manufacturer as a baseline. The master module can be mounted either inside the aircraft or outside the aircraft, as desired, the only requirement being that when mounted, the master module be aligned with the fundamental aircraft coordinates so as to provide a sufficient baseline to which all other aircraft measurements can be compared.

At another location on the airframe remote from the baseline fixture, a remote module, similar to the master module, is mounted. For example, if it is desired to insure proper alignment of the INS mount 15 with respect to the baseline fixture 12, the remote module will be mounted on the INS mount 15. In a like manner, if it is desired to check aircraft wing pitch with respect to the baseline fixture, the remote module may be mounted on a trammel point mount 16, which in turn is mounted on spars 18a and 18b on the wing of the aircraft, or on vertical stabilizer 20, in a manner to be more fully described with reference to FIG. 3. The readings taken from the master and remote modules are then compared at the master module and a net difference in disposition can be determined.

The master module will be described in more detail with reference to FIG. 2. Illustrated therein are aircraft alignment module components 22 and 24, control and display electronics 26, and printer 28. The alignment module components comprise potentiometric vertical indicator 22 of the type produced by the Humphrey Company, San Diego, Calif., part no. Modified V119-0103-1. The potentiometric vertical indicator 22 provides a pair of orthogonally disposed pendulums for detecting pitch and roll as illustrated in FIG. 1. The potentiometric vertical indicators are enclosed in a compact silicone oil-filled, and pressure-sealed, stainless case. A directional gyro unit 24 is mounted on the same housing as the potentiometric vertical indicator, at right angles with respect thereto, to provide yaw information as defined in FIG. 1. A suitable directional gyro may be that produced by Lear Siegler Inc., Instrument Division, Part Number LSI Model 9010, which is completely self-contained and requires no external amplifiers.

The control and display electronics 26 includes a pair of displays 30a and 30b, for indicating one of pitch, roll and yaw from the master and remote modules, respectively, in accordance with the information selected by control knobs 32a and 32b.

The operation of the system will be discussed in more detail with further reference to FIG. 3 which illustrates the contents of the control and display electronics 26. Assuming that the master module has been placed at the gun mount 12 (FIG. 1) in order to establish a fixed baseline reference, it is desired to determine whether the INS platform 15 is in proper alignment with respect to the baseline reference. Another set of the alignment fixture module components 22' and 24' are disposed on the INS platform 15 (the remote location) in order to establish a remote module. The signals from the modules at location 12, along with the signals produced by the remote module at position 15, are delivered to the control and display electronics 26 at the master module, whereupon pitch, roll and yaw of the two positions 12 and 15 may be compared in displays 30a and 30b by rotating switches 32a and 32b accordingly.

Figure 3:
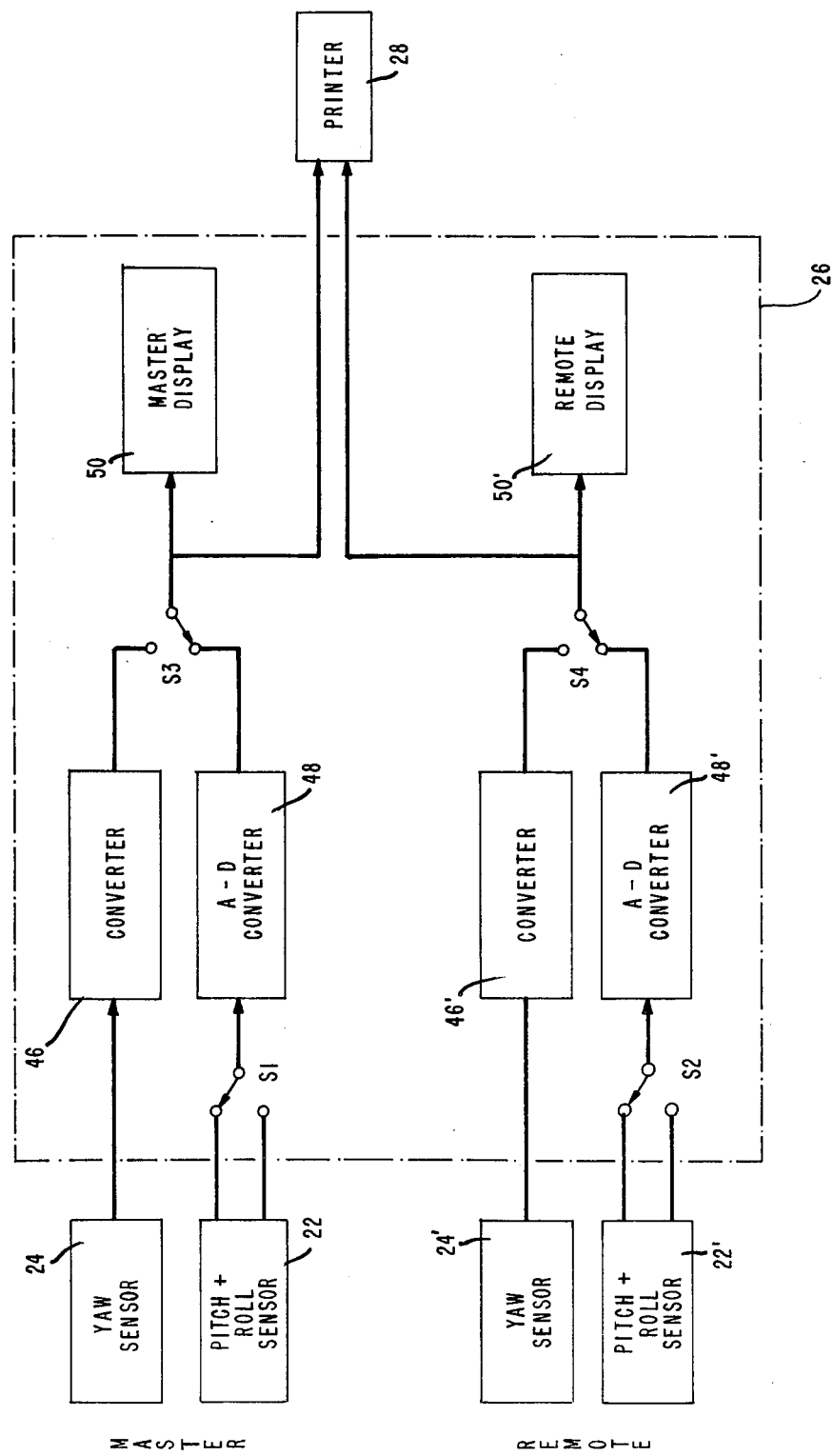
FIG. 3 is a block diagram illustrating the components included within the control and display electronics of the master module.

As shown in FIG. 3, control and display electronics 26 include A-D converters 46, 48, 46' and 48', and a pair of digital displays 50 and 50'. The signal from the yaw sensor 24 at the master module is delivered to A-D coverter 46, and the signal from the yaw sensor 24' at the remote module is likewise delivered to A-D converter 46'. One of the pitch and roll signals from pitch and roll sensor 22 in the master module is selectively delivered to A-D converter 48 via switch S1. Likewise, one of the pitch and roll signals from pitch and roll sensor 22' is selectively delivered to A-D converter 48' via switch S2. One of the outputs of A-D converters 46 and 48 is selectively delivered to the master display 50 via switch S3, while one of the signals from A-D converters 46' and 48' is selectively delivered to remote display 50' via switch S4. The signals which are selected for display in master and remote displays 50 and 50' are also delivered to printer 28.

In operation, the analog signals delivered to converters 46, 48, 46' and 48' will be converted into a digital format acceptable to master and remote displays 50 and 50' along with printer 28, such that one of the signals provided by sensors 22, 24, 22' and 24' may be visibly displayed on displays 50 or 50', and optionally printed at printer 28 to provide a hard copy. Switches S1 and S3, which are controlled by controlled knob 32a function to apply the selected signal to master display 50. Specifically, if it is desired to display the yaw of the master module, knob 32a will be placed in the yaw position, thereby placing switch S3 in the upper position to deliver the digital value of yaw to master display 50. If roll is desired to be displayed, knob 32a will be placed in the roll position, thereby placing switch S3 in the lower position and switch S1 in the position to apply the roll signal to A-D converter 48. Finally, when the display pitch knob 32a is placed in the pitch position, S3 remains in the lower position, and switch S1 switches to apply the pitch signal to converter 48. The operation of the remote portion of the system, under the control of knob 32b, is identical to that described with reference to the master portion, and will therefore be omitted.

By selecting the same signals at the master and remote locations, the pitch, roll and yaw of the master and remote locations can be individually compared, and any misalignments therebetween can be easily detected. Since the disposition of the remote module is compared to the disposition of the master module in real time, the aircraft does not have to be supported on jacks and leveled as is required in conventional transit measuring systems, since both the master and remote modules reflect any changes in the absolute disposition of the aircraft.

Returning to FIG. 2, the potentiometric vertical indicator 22 and the directional gyro 24 are mounted onto either the gun mount or the INS platform by providing an inverted "T" shaped track 34 at a convenient location on either of the fixtures. The indicators 22 and gyro 24 are fixedly secured to a pair of fixtures provided on "L" shaped bracket 36 by means of respective collar nuts 38 and 40. The L shaped bracket 36 is in turn fixedly secured to base assembly 42 by means of screws 44, or other suitable means. The base assembly 42 is provided with a cross-sectional configuration complementary to that of the inverted "T" provided by track 34 thus allowing the alignment components 22 and 24 to be slidably attached to, and removed from, track 34. The particular configuration of base 42 and track 34 will be more fully discussed below with reference to FIG. 4c. The control and display electronics 26 are also mounted in the track 34. Finally, printer 28 is fixably secured to the bottom of the control and display electronics.

Figure 2:
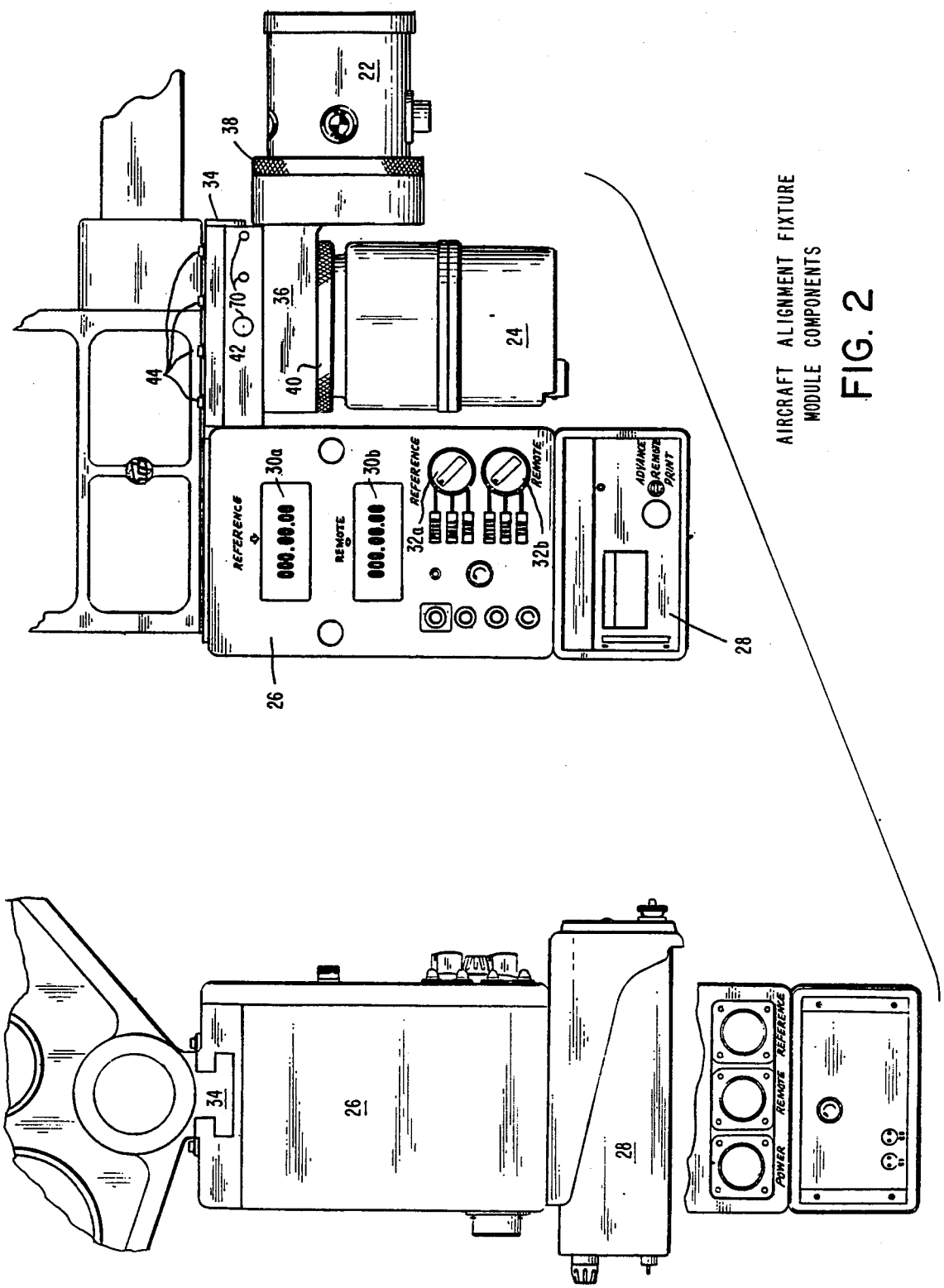
FIG. 2 is a detailed illustration of the master module and the elements contained therein.

Although FIG. 2 illustrates the master module, the remote module will be exactly the same except that the control and display electronics 26 and printer 28 are omitted. Thus, by providing the same "T" shaped track at both the master and remote locations, the alignment module components 22 and 24 may be fully interchangeable, thus dramatically reducing hardware requirements and operating costs.

The present invention further provides a novel technique for determining the orientation of a particular portion of the structure, such as the wing of an aircraft, over a given area of the structure. The trammel point assembly employed for this purpose is illustrated in detail in FIGS. 4A through 4G.

With reference to FIGS. 4A-4G, the trammel point assembly includes left and right hand portions 52 and 54, respectively. Mounted on left hand portion 52, as illustrated in FIGS. 4A and 4B, is the potentiometric vertical indicator 22', indicator 22' comprising the remote module. In this case, the remote module does not include the yaw sensor of FIG. 2, since it is assumed that it is only the pitch or roll of the wing relative to the master module which is desired to be detected. Of course, if it is desired to detect the yaw as well, the yaw sensor may be provided.

FIG. 4A illustrates a pair of the potentiometric vertical indicators 22' fixedly secured to the L-shaped bracket 36 by means of a respective pair of collar nuts 40. However, only one such indicator will be employed at any time, the location of the indicator depending upon the vertical or horizontal disposition of the trammel point assembly as used to detect the orientation of a particular structure. Specifically, the indicator 22' will be attached to one of the fixtures in the L-shaped bracket 36 (in position A) when it is desired to determine the pitch of a substantially horizontal structure, such as the wing as illustrated in FIG. 1, while indicator 22' will be attached to the other of the fixture on bracket 36 (in position B as shown in FIG. 4A), when it is desired to detect the vertical alignment of a structure, such as vertical stabilizer 20, FIG. 1. Whichever of the A and B positions is not employed, the interior of the bracket and associated apparatus in the trammel point assembly may be protected from the external environment by means of protective cap 56.

Fundamentally, the bracket 36 and associated apparatus, are designed to be fully interchangeable between master and remote modules. To this end, it can be seen that by removing base assembly 42 from bracket 34 in the master module, as illustrated in FIG. 2, and by removing gyro unit 24 from bracket 36, the base assembly 42, along with bracket 36 and indicator 22 may be moved to the left hand portion 52 of the trammel point assembly, thereby providing indicator 22' of the remote module. Such interchangeability dramatically reduces the hardware and operating costs, as well as operating time.

The specific structure of and 52 of the trammel point assembly will be described with specific reference to FIG. 4C. Illustrated therein is indicator 22' which is fixedly secured to bracket 36 by means of collar nut 40. The bracket 36 is, in turn, fixedly secured to base assembly 42 by means of screws 44, or any other appropriate means, such as welds, rivets, or the like. Spreader beam support 58 is formed with a generally cylinderical bore 60 having a guide pin 62 at the bottom of the bore and extending into the bore. The bottom portion of the spreader beam support 58 is in the shape of an inverted T about which the base assembly 42 is disposed. The inverted T shaped portion of spreader beam support 58 forms a track upon which the base assembly 42, and the associated apparatus therebelow is slidably mounted to thereby facilitate the placement of the base assembly unto the spreader beam support, and the subsequent removal therefrom. Although the base assembly 42 is illustrated as comprising a single unitary structure, the base assembly 42 may alternatively be constructed of upper and lower portions held together by screws 44, to thereby facilitate the construction of the base assembly 42, in any well known manner.

The top of the spreader beam support 58 is provided with a pinion gear 64 which is disposed on the support 58 so as to partially extend vertically into the cylinderical bore 60 and is fixedly secured to adjustment knob 66. Also on top of spreader beam support 58 is disposed a probe or stud guide 68 which is adapted to abut a predetermined portion of the surface to be investigated, such as a wing spar, as will be more fully described below.

With brief reference to FIG. 2, base assembly 42 is provided with a plurality of threaded bores 70 which are adapted to receive bolts attached to hand supports 72 and brace 74. Threadedly secured to brace 74 is brace stud 76. Brace 74 extends vertically upward so as to allow the top of brace stud 76 to generally fall within the same horizontal plane as the top of stud guide 68. The exact location of brace stud 76 may be adjusted by means of knob 78.

The right hand portion 54 of the trammel point assembly will now be discussed with reference to FIGS. 4E and 4F. Reference numerals which identify structures having substantially identical counterparts in the left hand portion 52 will be referred to by identical prime reference numerals. A spreader beam support 58' substantially indentical to that in the left hand portion 52 is provided with the central cylinderical bore 60', the lower inverted T-shaped track, guide pin 62' partially extending into the bottom of bore 60' probe or guide stud 68' extending vertically from spreader beam support 58', and pinion gear 64' partially extending into bore 60' at the top thereof. Pinion gear 64' is controlled by knob 66'. The inverted T shaped portion of spreader beam support 58' is slideably disposed within base assembly 42' having hand supports 72' and brace 74' attached thereto. Brace stud 76' is threadedly secured to brace 74' and is adjustable by means of knob 78'.

It can therefore be seen that not only are the modules 22 and 24 fully interchangeable within bracket 36 and base assembly 42, but the entire assemblies may be interchangeable within the trammel point assembly. Specifically, the base assembly on the left hand side may be removed from spreader beam support 58 and disposed on the spreader beam support 58' on the right hand side, while base assembly 42' may likewise be disposed on spreader beam support 58 on the left hand side.

Disposed within each of the spreader beam supports 58 and 58' are rods 80 and 80' having racks 82 and 82' at the tops thereof. The rods 80 and 80' extend all the way through the central bores 60 and 60' such that pinion gears 64 and 64' are in contact with the respective racks 82 and 82'. Fixedly secured to rods 80 and 80' by means of lock pins 84 and 84' is a spreader beam 86 which functions to maintain the left and right hand portions 52 and 54 apart by a predetermined distance. The distance between the left and right hand portions 52 and 54 may be changed by removing the rods 80 and 80' from the spreader beam 86 and substituting a new spreader beam of a different length therefor. The distance between the left and right hand portions may be finally adjusted by turning knobs 66 and/or 66' to effect movement between the rack and pinion pairs 82/64 and/or 82'/64'.

The operation of the trammel point assembly will now be described with further reference to FIGS. 1 and 4G. First, assuming that it is the pitch of the wings on aircraft 10 which is desired to be measured relative to the base line, and to each other, two points on each wing are preselected, the two points on the first wing being of identical location with the two points on the other wing. Preferably, two points on a pair of substantially parallel spars 18a and 18b as shown in FIG. 1, are selected. A technique for providing to such predetermined points is to provide a wing incidence check pattern 88 as illustrated in FIG. 4G. The pattern 88 is provided with a plurality of index marks 90 having a predetermined spacing therebetween. One of the patterns 88 would be applied (either by painting or provided as a decal) to the first spar 18a at a predetermined location thereon. As associated pattern 88 would then be applied along the second spar 18b, thus providing a pair of substantially parallel incidence check patterns 88 on one of the wings, along spars 18a and 18b. Two more of the incidence check patterns are applied to the same spars at the same locations on the other wing to complete the check pattern set-up. Additionally, any two surfaces of the structure which are desired to be compared for verticality may be so outfitted with incidence check patterns. For example, the vertical stabilizers may also be provided with the incidence check patterns in the manner just described.

The trammel point assembly having the potentiometric vertical indicator 22' in the A position, as illustrated in FIG. 4A is manually placed underneath the wing and adjusted in length so that stud guides 68 and 68' may be placed in abutment with associated alignment marks 90 on the pattern 88 from spar 18a to 18b. The brace studs 76 and 76' are adjusted and placed in abutment with the wing to steady the assembly. The knobs 32a and 32b, FIG. 2, are placed in the "pitch" position and the relative readings on the master module and the remote module are noted. The trammel point assembly may then be moved to an adjacent pair of points on the same wing spars 18a and 18b for further readings. The trammel point assembly may then be taken to the other wing and an identical set of readings taken, and compared to the first set in order to determine incidence between the left and right wings.

If it is desired to check the verticality of the vertical stabilizers 20, the same trammel point assembly may be placed at locations on the vertical stabilizers as determined by the incidence patterns placed thereon. The only modification which need be accomplished is to switch the vertical indicator 22' from position A to position B as illustrated in FIG. 4A so that the indicator properly provides the desired vertical information.

Finally, the present invention further provides a novel technique of determining and checking the alignment of a remote portion of the structure relative to the master location without having to dispose a remote module at the remote location. The alignment check component which allows this function to be preformed will now be discussed with reference to FIGS. 5 and 6A-6D.

Figure 5:
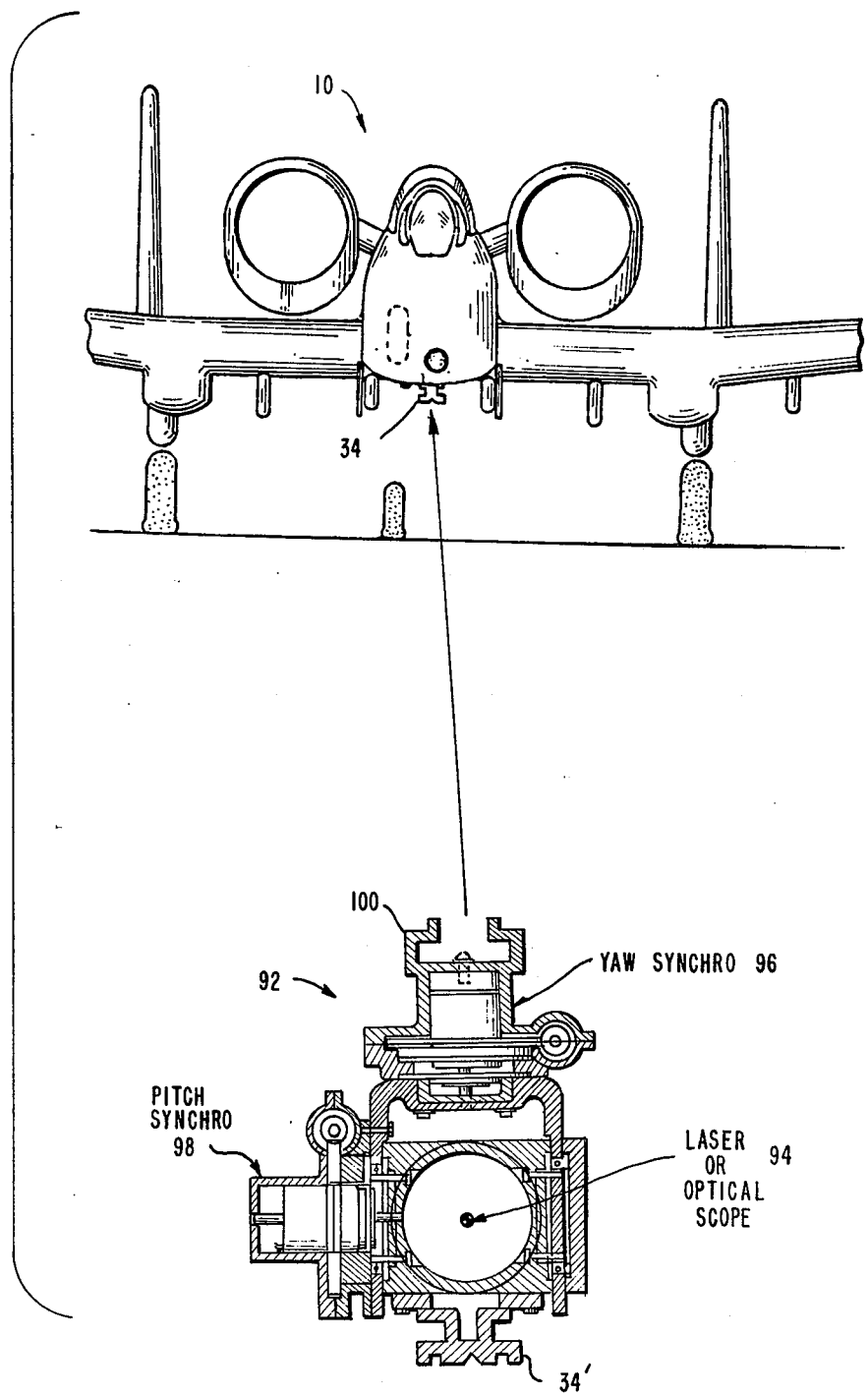
FIG. 5 is a diagram illustrating the placement of the alignment check component on a predetermined location on the aircraft.

The alignment check component 92 includes laser or optical scope 94, yaw synchro 96 and pitch synchro 98. The alignment check component 92 is provided with a base assembly 100 similar to base assembly 42 provided for the orientation sensors provided on the master and remote modules. Base assembly 100 is adapted to be slidably secured to the inverted T-shaped track 34 which is illustrated in FIG. 5 as being secured to the under side of the fuselage at a predetermined location to thereby establish a base line reference. Through the use of the base assembly 100, it is readily apparent that the alignment check component can be slidably secured to any of the inverted T-shaped tracks provided for the master or remote modules. On the bottom of the alignment check component is an additional inverted T-shaped track 34' which thereby allows a laser power source unit, the electronics 26, the potentiometric vertical indicators 22 and/or the gyro unit 24 to be mounted on the alignment check component if so desired.

Figure 6A:
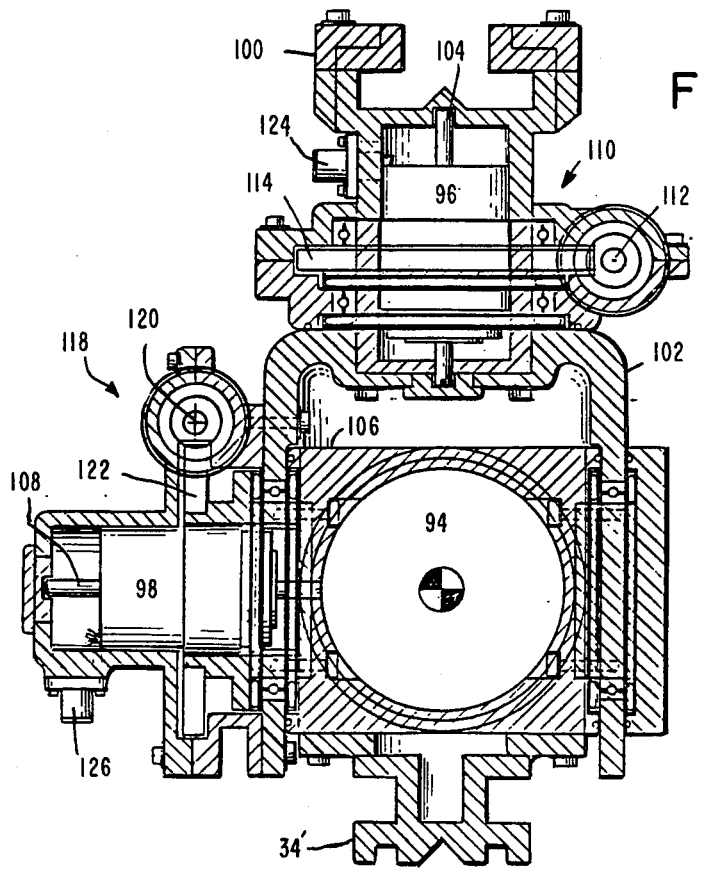
FIGS. 6A–6D illustrate in detail the alignment check component.
Figure 6B:
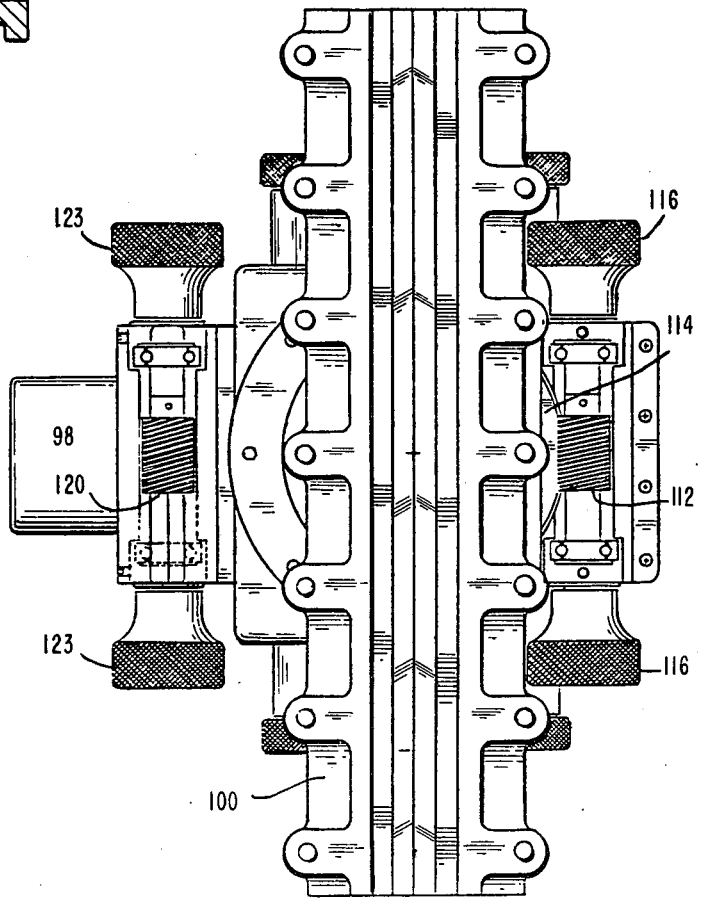
Figure 6C:
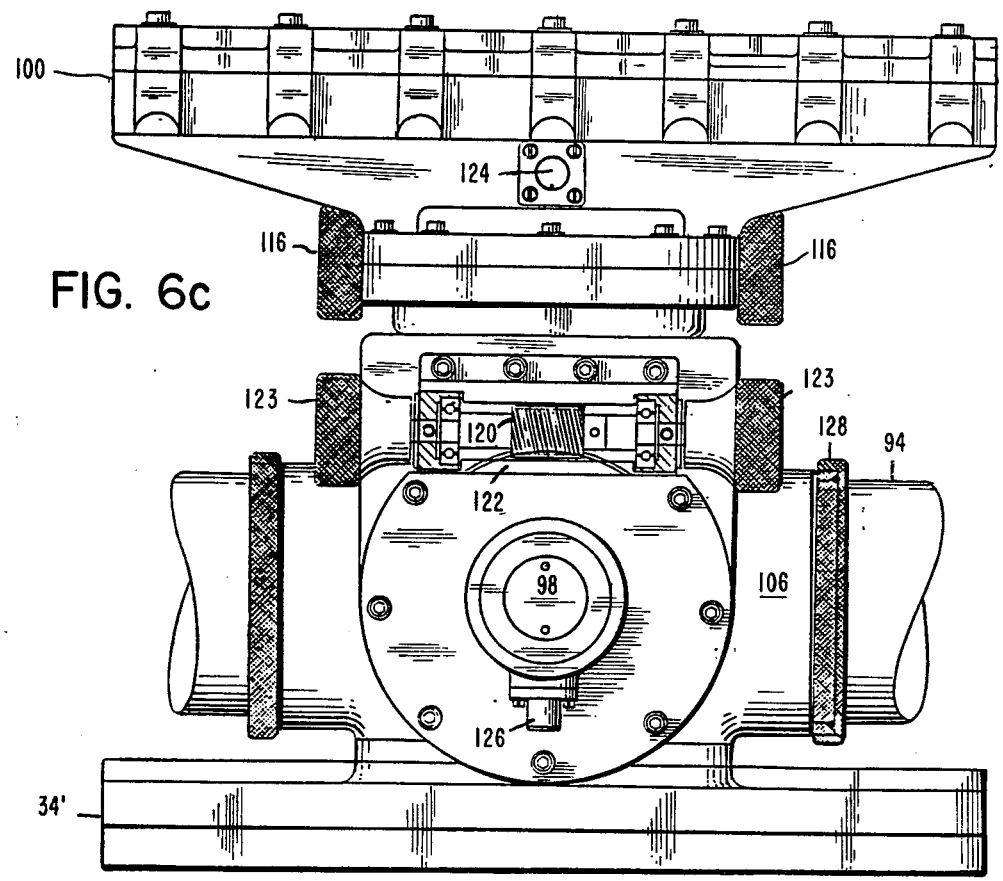
Figure 6D:
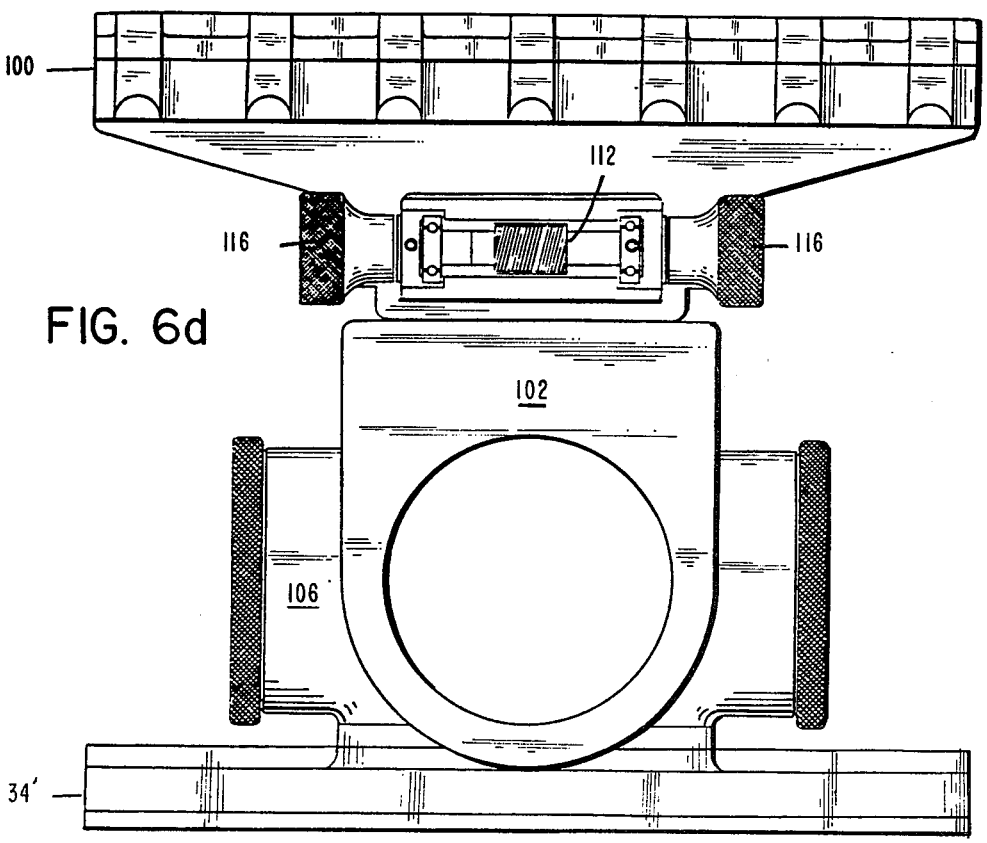

As best illustrated in FIG. 6A, the laser or optical scope 94 is secured to the base assembly 100 by means of a first platform 102 rotatably mounted through a vertical axis on the shaft 104 of the yaw synchro 96, and by a second platform 106 rotatably mounted on the shaft 108 of pitch synchro 98. Pitch synchro 98 and platform 106 are fixedly secured to the first platform 102, such that the entire assembly of the pitch synchro 98 and laser or optical scope 94 rotates on the shaft 104 of the yaw synchro 96.

The shaft 104 of the yaw synchro 96 may be rotated through a substantially vertical axis relative to the base assembly 100 through the use of a first worm gear 110 comprising a threaded shaft 112 and a circular gear 114 in mesh with the threads on the shaft 112, such that upon rotation of the shaft 112, the shaft 104 will rotate.

Yaw adjustment knobs 116 are provided for effecting the rotation of shaft 112. Similarly, the rotation of shaft 108 on pitch synchro 98 is controlled by a second worm gear 118 comprising a threaded shaft 120 and a circular gear 122 in mesh with the threads of shaft 120 and connected to synchro 98, such that upon rotation of shaft 120, shaft 108 will be rotated about a substantially horizontal axis, thereby rotating the second platform 106. Pitch adjustment knobs 123 are provided for rotating shaft 120.

The synchro 96 and 98 may be of the resolver/transmitter type produced by Kearfott Part No. CT41093001. The synchro units 96 and 98 are placed on the alignment check component so as to produce predetermined signals when the first and second platforms attain a predetermined orientation, such that the exact orientation of the laser or optical scope 94 can be determine relative to base assembly 100 by simply examining the signals from the yaw and pitch synchros 96 and 98, respectively. The signals from the yaw and pitch synchros are available at electrical connectors 124 and 126, and are provided to the master module therefrom.

In operation, the laser or optical scope 94 is mounted onto either side of the platform 106 by means of collar nut 128 or other suitable means. The entire alignment check component is mounted by placing the base assembly 100 over the inverted T-shaped track 34 at the appropriate location. The control and display electronics are in turn mounted onto the inverted T-shaped track 34' on the bottom of the alignment check component, along with bracket 36 if either of the potentiometric vertical indicator 22 or gyro unit 24 are desired to be additionally mounted thereon. The signals from connectors 124 and 126 are applied to the appropriate inputs on the control and display electronics, as are the signals from the potentiometric vertical indicator and gyro units 22 and 24, if they are employed.

The operator then adjusts the yaw and pitch of the laser or optical scope 94 by turning knobs 116 and 123, until the laser or scope is pointed to a precise predetermined location on the structure, at which time the yaw and pitch are noted on the display electronics. These values may be compared with predetermined standard values, or another reading from a symmetrical point on the structure may be taken and the two readings compared.

When a laser is used, the operator merely notes the existence of a "spot" produced by the laser at the appropriate target on the aircraft, while if an optical scope is employed, the operator merely detects alignment of the predetermined location on the structure with cross hairs or other indicia provided by the scope.

Thus, by either comparing the readings to predetermined values, or by comparing readings from symmetrical parts of the aircraft, the structural integrity of the aircraft can be determined without having to place a remote module at the remote locations. Additionally, this detection technique can be achieved without having to level the aircraft as is required in prior art transit techniques.

Although the invention has been described with respect to specific embodiments of the apparatus and processes, it is readily apparent that modifications, alterations, or changes may be made without departing from the spirit and scope of the invention as defined by the following claims.

What is claimed is:

1. Apparatus for detecting the orientation of a remote portion of a structure relative to a reference portion comprising:

reference track means adapted to be secured to said reference portion;

reference orientation detection means adapted to be slidably secured to said reference track means wherein said reference orientation detection means are adapted to be secured to said reference track means by reference bracket means, said remote orientation detection means are adapted to be secured to said remote track means by remote bracket means, wherein said reference and remote bracket means are substantially identical and each comprise first and second fixtures adapted to selectively receive portions of said reference or remote orientation detection means, said first and second fixtures on said reference bracket means being orthogonally disposed and said first and second fixtures on said remote bracket means being orthogonally disposed said reference orientation detection means comprising a first unit for detecting the vertical orientation of said reference portion and a second unit for detecting the azimuthal orientation of said reference portion, said first unit adapted to be mounted on said reference bracket means at said first fixture and said second unit adapted to be mounted on said reference bracket means at said second fixture;

remote tack means adapted to be positioned at said remote portion;

remote orientation detection means adapted to be slidably secured to said remote track means wherein said remote orientation detection means comprise a first unit for detecting the vertical orientation of said remote portion and a second unit for detecting the azimuthal orientation of said remote portion, said first unit adapted to be mounted on said remote bracket means at said first fixture and said second unit adapted to be mounted on said remote bracket means at said second fixture; and indication means for receiving signals from said reference and remote orientation detection means wherein said reference track means and said remote track means are of substantially identical configuration, whereby said reference and remote orientation detection means are interchangeable on said reference and remote track means.

2. The apparatus of claim 1 wherein said remote orientation detection means comprise a unit for detecting the vertical orientation of said remote portion, said unit adapted to be mounted on said remote bracket means at one of said first and second fixtures depending upon the orientation of said remote bracket means at said remote portion.

3. The apparatus of claim 1 wherein said indication means are adapted to be slidably secured to said reference track means adjacent said reference orientation detection means.

4. The apparatus of claim 1 wherein said remote track means is secured to a device having first and second ends adapted to be placed at first and second predetermined locations on a surface of said structure to thereby allow said remote orientation detection means to detect the orientation of said surface from said first to said second predetermined locations.

5. Apparatus of detecting the orientation of a remote portion of a structure relative to a reference portion comprising:

first and second bracket means each having first and second fixtures relatively disposed at right angles, said first bracket means adapted to be positioned at said reference portion and said second bracket means adapted to be positioned at said remote portion;

reference orientation detection means adapted to be disposed on said first bracket means;

remote orientation detection means adapted to be disposed on said second bracket means;

said reference and remote orientation detection means each including at least one of (i) a first unit for detecting vertical orientation and (ii) a second unit for detecting azimuthal orientation, wherein at least one of said first and second units is removably secured to at least one of said first and second fixtures on said first bracket means, and at least one of said first and second units is removably secured to at least one of said first and second fixtures on said second bracket means.

6. A device for use with apparatus for detecting the orientation of a surface of a structure relative to a reference portion, said device comprising:

first and second ends each provided with probe means;

orientation detection means adapted to be secured to said device to detect the orientation of said device;

whereby when said device is placed on said surface such that said probe means of said first and second ends are disposed at respective first and second predetermined locations on said surface, said orientation detection means detects the orientation of said surface from said first to said second predetermined locations.

7. The device of claim 6 wherein said orientation detection means is adapted to be secured to said device at at least one of said first and second ends.

8. The device of claim 7 wherein at least one of said first and second ends is provided with track means upon which said orientation detection means is adapted to be slidably mounted.

9. The device of claim 8 wherein said first and second ends are separated by a shaft, and at least one of said first and second ends is provided with means for adjusting the length of such shaft.

10. The device of claim 9 wherein said shaft is provided with a rack, and said means for adjusting a length of said shaft is a pinion gear in communication with said rack.

11. The device of claim 10 further including handle means at said first and second ends for facilitating the handling of said device, and brace means at said first and second ends for bracing said device against said structure.

12. A method for detecting the orientation of a surface of a structure relative to a reference portion comprising the steps of:

placing a first end of a device having bracket means having a fixture means relatively disposed at a right angle and having orientation detection means secured thereto on a first predetermined location on said surface, said orientation detection means provided to detect the orientation of said device;

placing a second end of said device, remote from said first end, on a second predetermined location on said surface;

disposing orientation detection means at said reference portion; and comparing the outputs of said orientation detection means on said device to said orientation detection means at said reference portion.

13. Apparatus for detecting the orientation of a selected portion of a deformable structure relative to a preselected location comprising:

target detection means adapted to be mounted at said preselected location;

first means for adjusting the azimuthal orientation of said target detection means;

second means for adjusting the vertical orientation of said target detection means;

third means for detecting the azimuthal orientation of said target detection means; and fourth means for detecting the vertical orientation of said target detector means;

whereby when said target detection means is aligned with said selected portion, said third and fourth means act to indicate the orientation of said selected portion relative to said preselected location.

14. The apparatus of claim 13 wherein said target detection means comprises a laser.

15. The apparatus of claim 13 wherein said target detection means comprises an optical scope.

16. The apparatus of claim 13 wherein said third and fourth means comprise synchro devices.

17. The apparatus of claim 13 wherein said first and second means comprise worm gears.

18. A method for detecting the orientation of a selected portion of a deformable structure relative to a preselected location comprising:

mounting a target detector at said predetermined location;

adjusting the azimuthal orientation and the vertical orientation of said target detector until alignment of said target detector with said selected portion is detected; and detecting the azimuthal orientation and the vertical orientation of said target detector upon said alignment to thereby detect the orientation of said selected portion relative to said preselected location.

* * * * *